United States Patent [19]

Reines et al.

[11] 4,081,613
[45] Mar. 28, 1978

[54] BI-DIRECTIONAL SIGNALLING ARRANGEMENT FOR TELECOMMUNICATIONS SYSTEMS

[75] Inventors: Jose Reines, Glen Ellyn; Eric Gordon Platt, Darien; Stanley Earl White, Hoffman Estates; Robert John Mahood, Arlington Heights; Joseph Michael Corrado, Chicago, all of Ill.

[73] Assignee: International Telephone and Telegraph Corporation, New York, N.Y.

[21] Appl. No.: 686,377

[22] Filed: May 14, 1976

[51] Int. Cl.² .................................................. H04M 3/02
[52] U.S. Cl. .............................. 179/18 J; 179/18 ES; 179/18 HB
[58] Field of Search .............. 179/18 E, 18 FA, 18 F, 179/18 FG, 18 FF, 18 J, 18 EB, 15 BY, 99, 18 HB, 18 H, 84 R, 18 AD, 18 ES, 84 A

[56] References Cited
U.S. PATENT DOCUMENTS

| | | | |
|---|---|---|---|
| 3,443,033 | 5/1969 | Louis | 179/18 J X |
| 3,641,275 | 2/1972 | Perna et al. | 179/15 BF |
| 3,760,120 | 9/1973 | Moorehead | 179/19 |
| 3,916,118 | 10/1975 | O'Neill | 179/99 |
| 3,978,293 | 8/1976 | Feiner | 179/18 HB |

Primary Examiner—Thomas W. Brown
Attorney, Agent, or Firm—James B. Raden; Marvin M. Chaban

[57] ABSTRACT

An arrangement for providing signalling to the lines of a telecommunications system employing non-metallic switching crosspoints such as a solid state switching network or time division switching network. In a system employing either type of network, line signalling such as ringing, coin control signalling, wire chief testing, and such other signals which are essentially high voltage signals cannot readily be transmitted through the switching network. The present system as disclosed provides an arrangement employing a common, multiplex highway between one or more signal sources and the line circuits. Operation of a switching element such as a relay in a line circuit selected by the common control completes a metallic path from the source bus to the selected line through closed contacts of the relay. In addition, signals of one or more different types may be multiplexed within a signal cycle to produce signals to a number of lines during the period when one line is being signalled. Within this framework, bi-directional signalling such as that required for testing lines can be readily implemented.

5 Claims, 7 Drawing Figures

BI-DIRECTIONAL SIGNALLING ARRANGEMENT FOR TELECOMMUNICATIONS SYSTEMS

RELATED INVENTION

The present application is an improvement using the principle of a co-pending application filed of even date herewith for signalling arrangement for Telecommunications Systems with J. Reines as sole inventor.

BACKGROUND OF THE INVENTION

In telephone systems having metallic crosspoints in its switching network, control and supervisory signals are developed in circuits associated with the junctor or supervisory side of the network. A considerable savings in access control devices and source circuits is effected in this manner.

In telephone systems which do not have a direct metallic path from the line side of the switching network to the supervisory side, a problem of economics and equipment arises in transmitting high voltage signals and service signals to lines. The same problem arises both in space division systems using semi-conductive crosspoints and in time division systems employing pulse modulation switching. The high voltage and service signals such as supervisory signals cannot be sent through the switching network. Therefore, these signals must be originated on the line side. Equipment must be provided to couple the sources of these signals to the lines on demand. This equipment comprises extensive amounts of adapters and auxiliary networks. In order to apply the signals to the line side, the usual approach is to provide adapters equipment on a per-line basis for connection of a necessary source circuit.

SUMMARY OF THE INVENTION

The present approach is especially applicable to systems which use a computer to control electronic switching networks and uses metallic highway from one or more signal sources to a standard relay within the line circuit to provide line signalling from the line side of the network under the control of the central computer. Thus, when a signal is necessary, the computer addresses the relay in the line circuit for the line to which the signal is to be applied. The relay is energized to complete a common path to the signal source for the transmission of signals to the line which has its ring relay energized. By this process, the signalling whether it be ring signals, party line ring signals, coin control signals or test signals, etc. may be sent out to the selected line. In addition, by providing added contacts, the same relay can be used to provide two-way signalling such as that deriving from and to a wire chief test position.

The signals in question fall into a number of general categories: (1) Multi-party line ringing; (2) Coin control signals, (3) PBX signalling, and (4) Test signalling such as the two-way signalling necessary for a wire chief's test desk, and further may include other miscellaneous signals.

In systems currently in use, a ring relay is provided in each line circuit. This ring relay is used as the line signalling relay, operated on a selection by the computer. The line side of one terminal from the standard line circuit transformer is normally grounded. The other terminal is usually coupled to adapters and auxiliary switching apparatus for coupling the signal source to the selected line. In the present circuit, a common grounded bus is provided from the signal source circuit, the path to the bus being completed through closed contacts of the ring relay of a selected line circuit to couple the signal bus to the line having its ring relay operated.

If one type of signal such as ringing is to be sent to more than one line at one time, by operating the ring relay in the line circuits of the lines to be rung, the common ring bus path is closed to those lines.

Using this basic principle, a number of refinements or improvements become possible.

For example, in the systems now in use, for party line frequency-selective ringing, the respective intervals making up a time division multiplex time slot can be used to provide a time division control of the specific ringing frequency to be applied to a line.

Further, where the signals to be sent are those which preferably should be delayed (coin control signals), the ring time slots can be divided into intervals to replace a ring signal with a coin control signal by what is called "microcycle stealing", i.e., interrupting the ring during an interval and substituting the coin control signal during that interval or micro-cycle.

As a further improvement, lines of various types requiring special signals can be grouped, and through the use of a special, common auxiliary network can switch different signals in time division multiplex. For example, lines requiring coin control could be grouped on one shelf and PBX lines on another. To provide ringing over either of the leads, tip or ring to divided-ring party line, a space division network may be provided to close either one or the other path for the ringing as selected by the computer.

The disclosed basic principle may most readily be implemented by the special use of a conventional relay of the line circuit, preferably the relay commonly used for ring purposes. This conventionally-used relay is operated when the line circuit is seized for transmission of signals to the line served by the line circuit.

As a further improvement, when two-way signalling is to occur such as is necessary for line testing under the control of a wire chief test desk, a further set of contacts may be added to the relay to receive signals over a conductor and through the added contacts of the ring relay. The added conductor may be used to carry a return signal from the line indicative of the condition of the line under test.

DETAILED DESCRIPTION OF THE DRAWINGS

Figure 1:
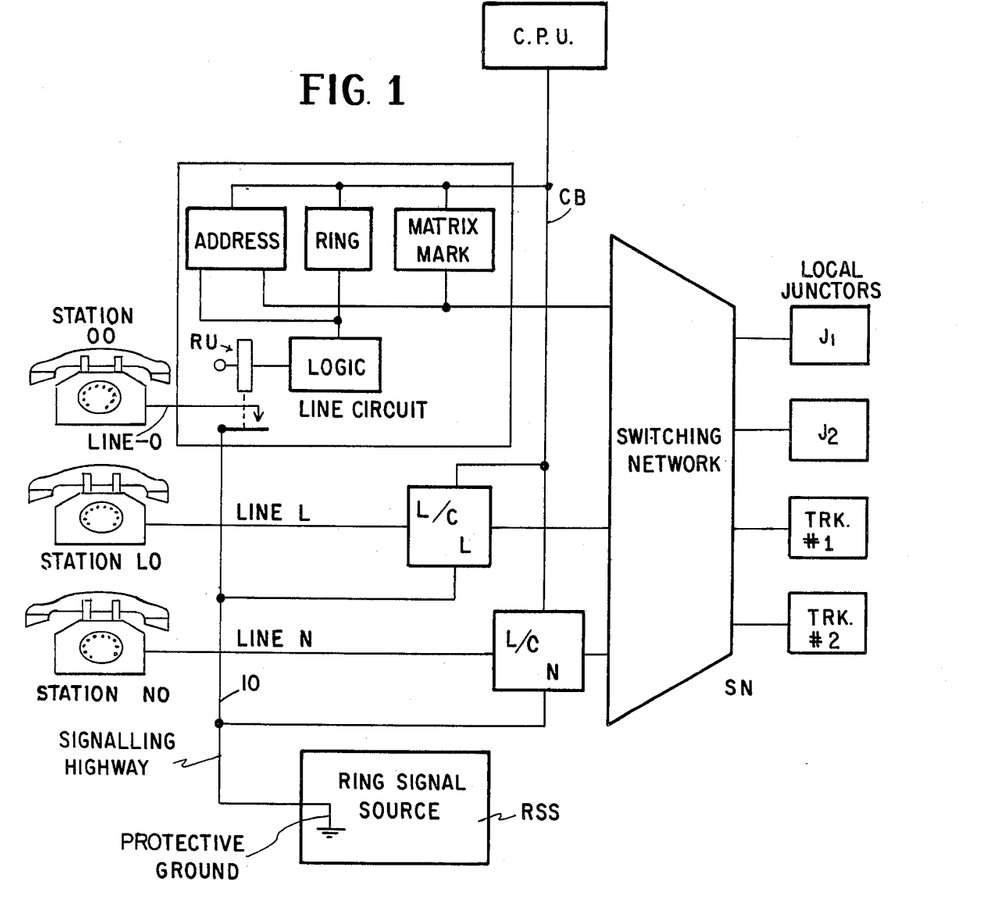
FIG. 1 is a simplified schematic block diagram of a portion of a telephone system employing a simplified embodiment of the invention.

In FIG. 1 is shown a portion of a simplified telephone system of the general type shown in co-pending application Ser. No. 426,612 filed 12/12/73, now U.S. Pat. No. 3,962,552, issued June 8, 1976. That patent shows a computer controlled PABX using an electronic switching network. The switching network may be of the type shown in either U.S. Pat. No. 3,801,749 as issued 4/2/74 to N. Jovic or that shown in U.S. Pat. No. 3,204,044 issued 8/31/65 to V.E. Porter, or any similar suitable switching network. In the simplified circuit of FIG. 1, each line circuit —L/C 0 — L/C N represents the in-office interface between a station and an appearance on the line side of the switching network. The present invention is also applicable to systems using time division or digital switching networks.

The presently disclosed invention is usable with a switching network of the type shown by either the Porter or the Jovic network within a computer-controlled system of the type shown by the cited co-pending application, now U.S. Pat. No. 3,962,552. In the last-mentioned system, there is shown a PABX while the present system may preferably be applied within a PABX or a Central Office using the same general principles or within a processor-controlled system using TDM or PCM switching in the central process (CPU). The switching network SN and the general call processing principle used in the system of the cited patent are also directy usable herein.

As viewed in FIG. 1, there is shown a plurality of line circuits L/C 1-0 — L/C 1-N. Each line circuit has an appearance on the switch network (SN) for path completion in known fashion through trunks, links or junctors on the supervisory side of the switching network. Each line circuit is connected by a conductor to a remote terminal apparatus through conventional distributing apparatus (not shown). In FIG. 1 the terminal apparatus shown is a single station — Station 00 or line 0, station LO for line L and station NO for line N. Each line circuit also has a connection to an I/O bus (CB), the bus being connected to a computer CPU. The CPU in question may be of the type shown by the cited patent or may be of the type sold by General Automation Inc. under the model SPC-16, or may be any suitable replacement therefor.

A common metallic highway 10 extends for a ring signal source circuit (RSS) which may be a conventional ringing generator to each line circuit. Within the ring source generator, there is provided the common protective ground for the line or lines to be rung. The ringing generator or Ring Signal Source RSS may, for simplicity of explanation, be considered as any normally operating source of conventional interrupted ringing current which is applied to ring bus 10 on a continuous basis.

If in the circuit of FIG. 1, it is desired that RSS be operated only on demand from the CPU, a connection may be made between RSS and CPU bus CB (not shown) to supply the ring signal in response to the operation of an address recognition circuit and to a ring command recognition circuit to actuate the ring source.

In the circuit of FIG. 1, each line circuit is equipped with a signal control or RU relay which responds to recognition of the address of the line circuit by Address Circuit 21, and to a ring command circuit labeled box 23 to operate its RU relay through logic 25, the address and command emanating from the controller CPU in known fashion.

In the circuit of FIG. 1, on a call to station 00 for example, the CPU addresses line circuit L/C 0—0 and provides an operating ring command through logic 25 to cause relay RU of line circuit L/C 0—0 to operate. Relay RU closes its contacts RU 1-4 to complete the path from ring source bus 10 to the station 00. In one preferred mode, the ringing generator of RSS is continuously operating, thus an interrupted ringing signal is applied from RSS over lead 10 to station 00 on operation of relay RU.

If more than one line is being rung at the same time, operation of the RU relay of each line being rung applies the ring current from the ring source bus to that line in addition to the application to line 0 and station 00, as noted in the prior paragraph.

Thus in FIG. 1, the common highway 10 is connected to provide a metallic ring path to any station or stations whose RU relay has been operated by the CPU, as indicating the need for the application of ringing current to the line serving that station or to the lines serving those stations.

In FIG. 1 is shown a system which provides a common bus or highway from a source of ringing current to one or more lines through selectively addressed line circuits. Within the line circuit or circuits, selection causes operation of the ring relay RU to complete a path to the station or stations coupled to that line from the ring source bus RSS.

Figures 4, 7:
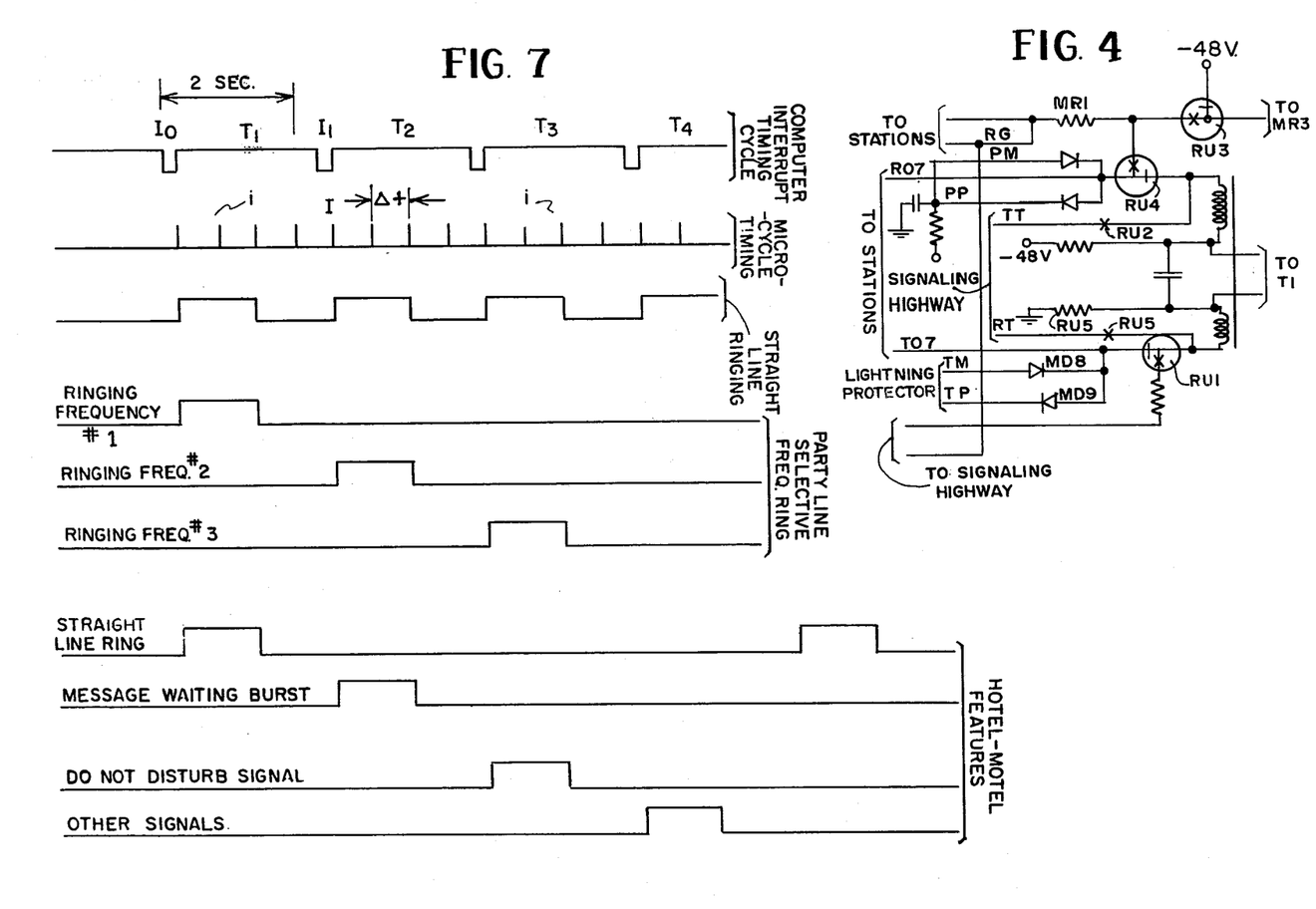
FIG. 4 is a schematic circuit drawing of a revised portion of the line circuit of FIG. 3 for implementing a further improvement.
FIG. 7 is a timing chart of the operation of the invention.

By applying the wave forms of FIG. 7, the circuit of FIG. 1 illustrates the method used for applying ringing to the telephone line in the TCS systems. For straight line telephones a ringing current waveform (RW) is always available at the RG input to all line circuits. During the call processing function, the computer determines that it wishes to ring a given line circuit during time, T1 and T1+4, etc., the given line circuit. A timing circuit issues interrupts (I) synchronized with RW. Upon receiving the I interrupt, the computer determines which relays need to be operated in which line circuits, and which relays need to be released in appropriate line circuits, so that ringing current flows or does not flow to the approprite telephone sets. The computer then commands the line circuits to operate or release the ringing relays during the silent intervals of RW in order to avoid the inductive disturbance that would have been generated by the switching of those relays during the ringing current.

For frequency selective party line working, the same procedure takes place except that for each timing slot T, the content of RW involves a different ringing frequency. Thus if party line with ringing frequency F3 wishes to be rung, the computer will list that line under T3 and proceed to operate the ringing relay at the end of T2 during the silent interval. Ring tripping, of course, does not have to wait for the silent interval, but occurs when the line circuit detects that the telephone has gone off-hook.

Figure 2:
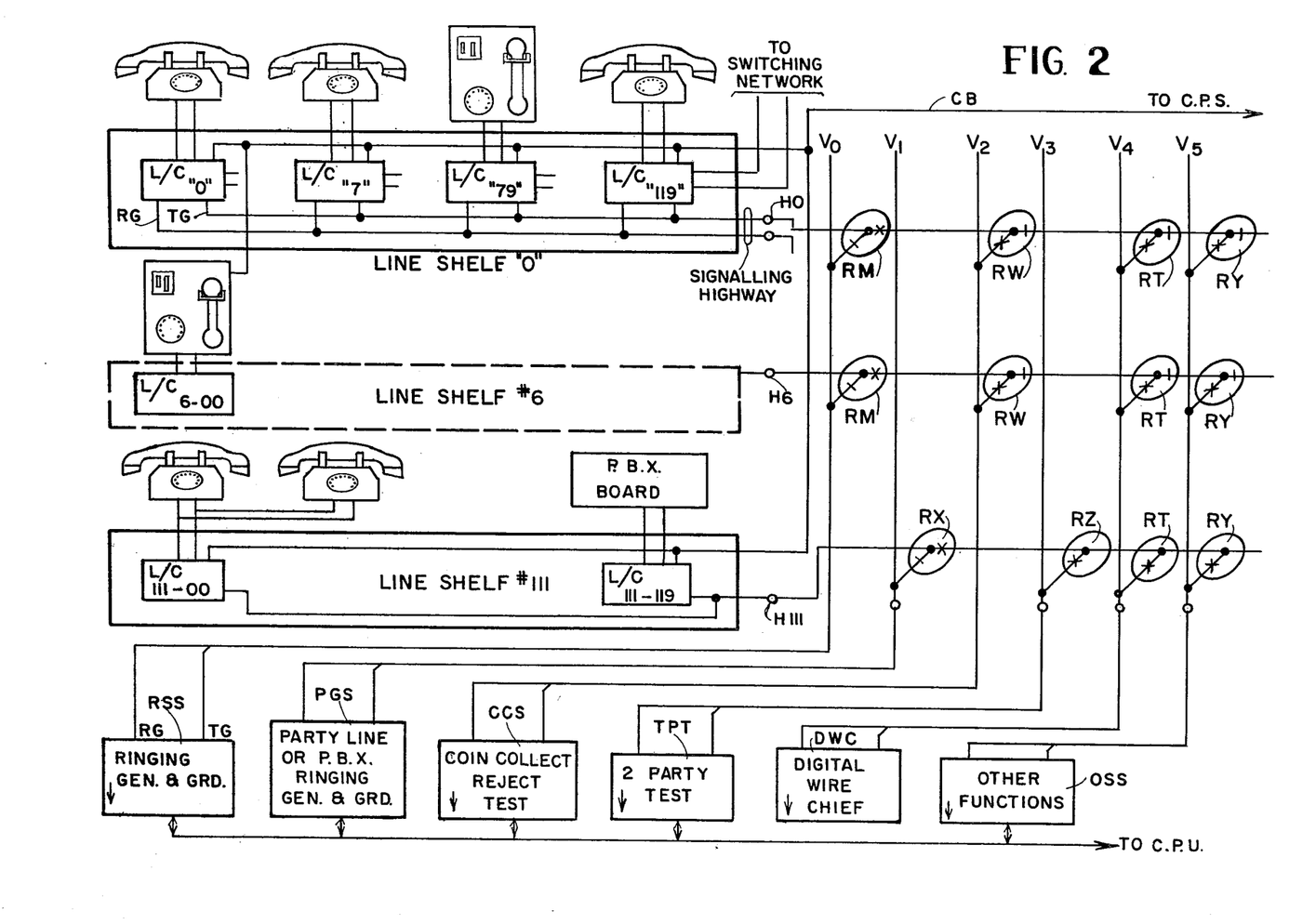
FIG. 2 is a schematic block diagram of the system portion of FIG. 1 employing a more complex embodiment of the invention.

In FIG. 2 is shown a second embodiment of the invention employing the principle of FIG. 1 to provide a plurality of different signalling services to the lines. In FIG. 2 is shown a plurality of lines, the lines being assigned to line shelves with a suitable number of lines or line circuits per shelf. Shown representatively are three out of a plurality of shelves, one conventional system having 112 such shelves. Lines of various types are grouped on shelves, so that in FIG. 2, shelf 0 has only single party lines and pay station lines. No multiple party lines are connected to shelf 0 in the example shown. Shelf 6 as shown has a pay station line on line 6-00 and single party lines (none being shown). The final line shelf (shelf 111) shown has lines for single party lines (not shown), multiple party lines, PBX lines, and no pay stations.

Each line circuit has a connection to the computer I/0 bus (not shown in FIG. 2) for the addressing and commanding of the line circuits by the computer. Each line circuit has an appearance on the line side of the switching network (not shown in FIG. 2).

Each line circuit has two signaling leads RG and TG which are respectively commoned to like signalling leads from the other line circuits of the same shelf, to form the horizontal conductor of a crosspoint matrix of metallic crosspoints such as reed relays. Each shelf in the exchange may therefore be considered as having a common signal highway comprised of leads RG and TG to the matrix conductor multiple. Thus, one coordinate of the matrix is comprised of a pair of paths common to the line circuit conductor pairs, each pair comprised of a TG lead and an RG lead. Each shelf pair terminates at a pair of crosspoints (each pair being represented as a single crosspoint in FIG. 2).

The signalling sources of the system, as connected to the vertical multiple conductors VO-V5 in FIG. 2 are Ringing Ground and Generator (RSS), Party Line and PBX Ringing Generator and Ground (PGS), coin control signalling (CCS), two-party test (TPT), Digital Wire Chief (DWC), and other signalling sources (OSS).

Each of these sources is connected to the CPU by way of contacts of a respective relay such as relay RM for straight line ringing (VO), RX party lne or PBX ringing (VI), RV for coin collect (V2), RZ for two party testing (V3), RT for the digital wire chief (V4) and relay RY for any other signalling function (V5) which may be desired to receive control address and command signals. Each source has a pair of vertical conductor multiple appearances on the matrix indicated by individual conductors VO–V5. Certain of the matrix intersections have no crosspoints where there is no need for connection from the vertical to the horizontal multiple. Stated another way, if a shelf has no lines of a particular type, it needs no crosspoints to sources of unneeded signalling. Where shelf 0 in the present example, has single station lines and pay station lines, the horizontal conductor pair for shelf 0 will have crosspoints comprised of contacts of relay RM connecting the horizontal pair to the Ringing Generator RSS, the Coin Collect or Coin Control Signalling Source CCS, the Digital Wire Chief DWC and any other signalling functions at source OSS.

Shelf 6 which has lines connected to single stations and pay stations will have the shelf multiple pair connected to the crosspoints for connections to ringing generator RSS, Coin Control Source CSS, Wire Chief DWC and other source OSS. The final shelf 111 has its multiple pair connected through crosspoints to party line source PGS, two party test TPT, the wire Chief DWC and the other functions source OSS.

In the circuit of FIG. 2, the crosspoints could be mercury or reed relay contacts which are operable at high speeds to close metallic contact paths to enable the passage of high voltage and D.C. signals, high voltage in the sense used in this application being ringing voltages and the like.

The relays controlling crosspoints such as VO-HO, VO-H6, V6-H111, V2-HO, etc. are each controlled by the computer in an obvious manner to control the closure of a metallic path from the desired source to the shelf of the line circuit to which the signal from the source is transmitted. The one or more lines to receive and transmit that signal to their lines will have their RU relay operated to pass the required signal to the line over the common metallic highway.

By the use of the matrix of FIG. 2, plural signalling sources may be used and connected to shelves on demand. Thus, plural common highways are directed from the respective sources to shelves requiring signals from these sources through the crosspoints, as required. Only one ring source would be connected to a vertical, while on the shelf as many lines as might require that signal from the source are connected to the horizontal.

In FIG. 2, the contacts of the crosspoint relays are configured to provide a preferance chain by the position of the break and make contacts of each crosspoint set. Dependent on the desired priority chain, the contact arrangements would be configured to implement the desired order.

As is well-known, there are certain signals that cannot tolerate an extensive delay, the concept of microcycle usage is developed. FIG. 7 typically illustrates a timing diagram with a familiar ringing current waveform and the familiar interrupts (I). However, between each two interrupts, three additional interrupts occur to segment a total of four microcycles per ringing current cycle. While the number four for microcycles is not critical, it appears to be a reasonable compromise to allow approximately ⅛ second microcycles for straight line ringing. Normally the lower case interrupts (i) are masked to avoid real time impact on the computer. However, on determination that it is necessary to send a coin return signal, for instance, the computer proceeds to place the request for sending a coin return signal for a particular line at the top of the next microcycle list, and the computer program proceeds to unmask the lower case interrupts (i).

At the next interrupt (I), the computer then operates relay RM, thus disabling ringing temporarily while operating the relay that permits the coin return circuit to access the common highway. The signal of coin return is then sent to all lines of the particular shelf (that have relay RU operated) and which had been put on the list. The signal is sent for ½ second or if more time was required, two microcycles corresponding to one second could have been employed. Afterwards, the procedure would be reversed reverting back to the ringing condition that had prevailed before.

For those few instances, during which a signal that cannot be deferred such as coin return is to be sent to the common highway, then the principle of microcycle usage from the ringing generator is implemented. During one interval between interrupts (i), the ringing is interrupted by causing release of the RU relays previously operated. The special coin return is activated during that interval and the RU relay for the coin box line is also activated. In the worst cases, the subscribers who had been receiving ringing will miss a microcycle or two of ringing during the interval when coin control signalling had been substituted.

Figure 6:
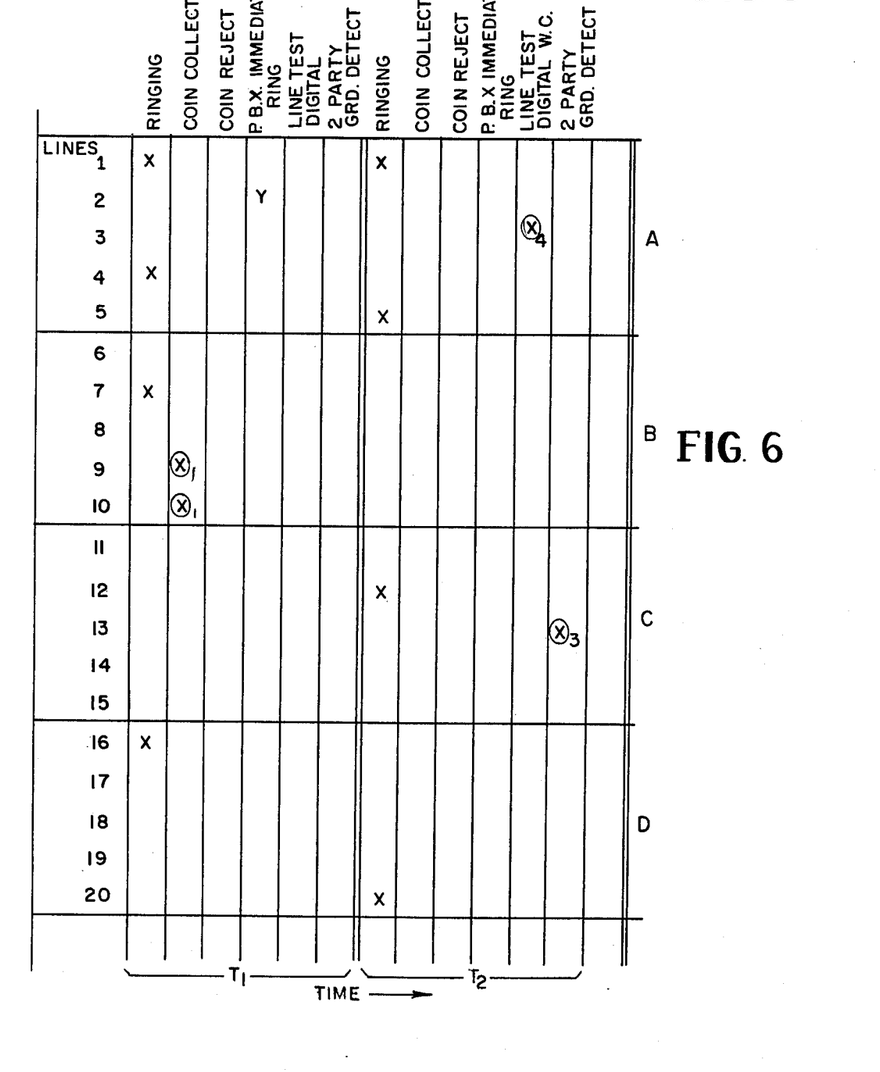
FIG. 6 is a chart showing a possible arrangement of lines of various types within line 1 groups of the system of the second embodiment.

The priority precedence allowed for the different signals is variable and selectable, as desired. For instance, in the above example, we chose to put coin return signals ahead of ringing. FIG. 6 illustrates an example of how the common signal highway concept may be used in a hypothetical situation for the 20 lines shown. For instance, we see that during time T1, lines 1, 4, 7 and 16 are in the ringing condition. In addition, we note that in microcycle 1 of timing slot T1, the computer performs a microcycle usage operation so that lines 9 and 10 can simultaneously send coin collect signals to the respective coin boxes. Assume also that line 2 is a PBX line and has to perform the immediate ringing function during T1. So even though line 3 has a request for the line test facility this request is deferred until T2 in order that the ringing be immediately available to line 2. During time T2 lines 2, 5, 12, and 20 are receiving ringing under computer control. Here it is worthwhile to note that line 2 which started immediate ringing during time T1 continued with its ringing during T2 since the burst at T1 had been indeed very short. We also note that line 3 which had its request for a line test facility deferred at T1 now uses a microcycle and performs the test requested through the wire chief.

It is worthwhile to restate the reason for using digital measurements with respect to wire chief testing. Each microcycle is only one-half a second long in the example given here and therefore not of sufficient length for a human to be able to read it with ease. However, if a signal is available in digital form it can be taken into the computer memory and displayed through a teletypewriter or through a digital display of any known type. Although this approach seems to solve a particular problem, in fact, it is an advance in the wire chief technology since it provides hard copy of measurements made and also more precise displays that the maintenance man can use in his analysis and operation of the exchange and of the outside plant.

Continuing with time T2 is should be noted that line 13 uses one microcycle to perform two-party ground detections. In analyzing FIG. 8, it is noted that because of the requirements for coin collect in lines 9 and 10 during T1 there may be conflict with PBX immediate ringing. This conflict may occur because at the time at which the coin return signal is beng sent, namely, microcycle number 1, the immediate ringing requirement for the PBX line may have to be actuated. In the normal course of priorities this may involve the aborting of the coin return signal in favor of an immediate ringing signal for line circuit 2. Also, in timing cycle T2, since line 3 requires the use of a microcycle for line testing and line 13 requires the use of another microcycle for two party detection the ringing cycle during that interval may be reduced to one-half its normal length. Section D on FIG. 6 shows line 16 ringing during T1 and line 20 during T2 with no cycle use and no conflicts. This is, in fact, the normal condition in the exchange whereas sections A, B, and C are shown during heavy traffic and attempt to illustrate worst case conditions.

Sections A through D in FIG. 6 can also illustrate how a descriminating allocation of lines in groups and the use of independent sub-highways can minimize or completely eliminate potential conflicts. For instance, assume that Section A represents one highway not connected to any of the other sections and that we allocate to that section of lines standard telephone and PBX lines. In reviewing the section, if there is no conflict during time T1 other than the deferral of the line testing, no meaningful delays in the operation of the system are caused. During time T2 a microcycle is used for the purpose of performing the line test function where again no conflict exists. Previously there was a conflict with line 13 which would have used another microcycle from T2. Next assume that in line sections B, only coin telephones and standard lines are provided. The only conflict is that one microcycle is used from T1 in extremely heavy traffic conditions. To section C, only two party lines are allocated and again no conflict can be found other than the use of one microcycle during T2 for line 13. Section D shows absolutely no conflicts with line 16 ringing during T1 and 20 ringing during T2.

Figure 3:
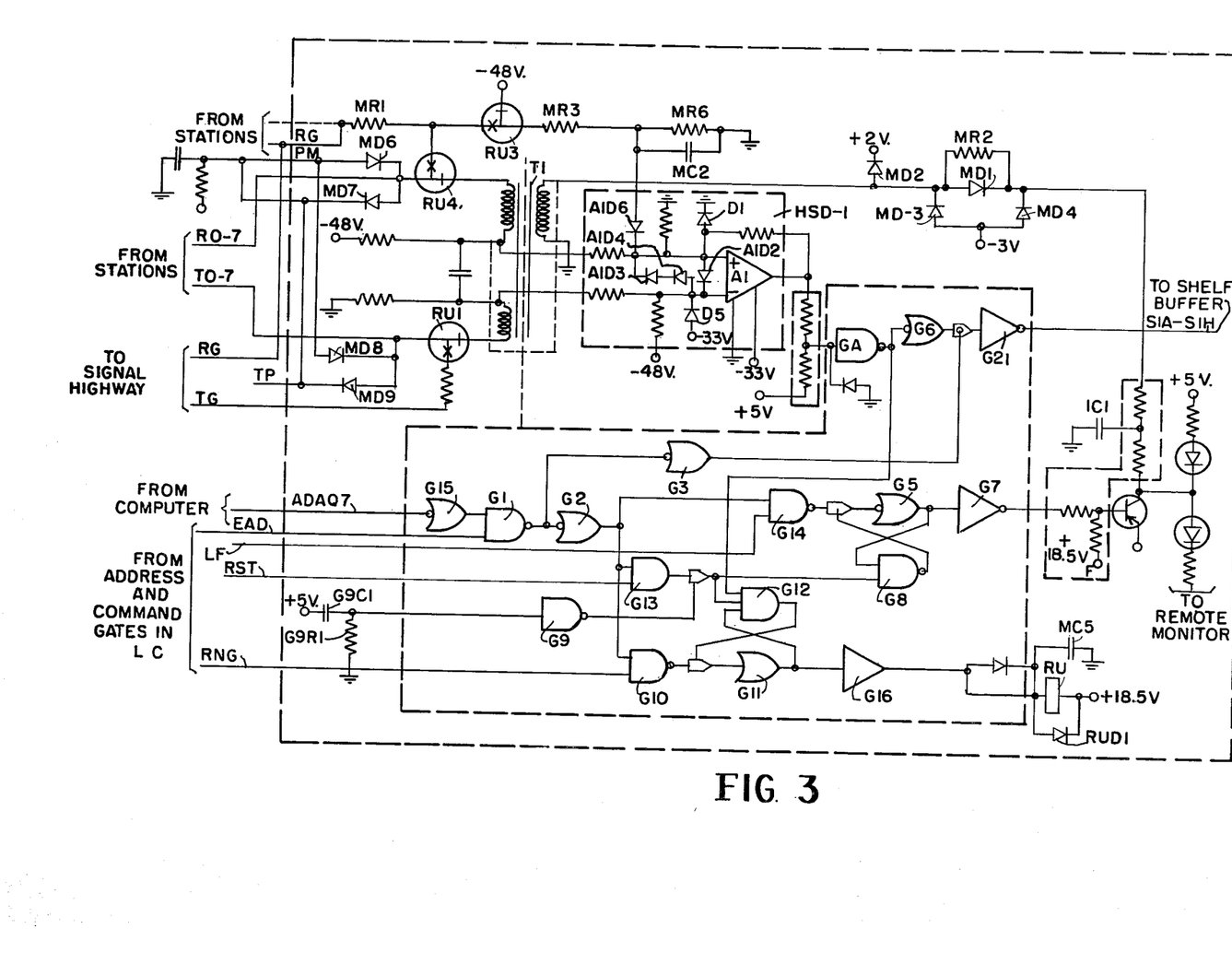
FIG. 3 is a schematic circuit diagram of the relevant portion of a line circuit fo use in the showing of either FIG. 1 or FIG. 2.

When the line of the line circuit of FIG. 3 is addressed by the computer, input signals are received on lead ADA and lead BAD from the adressing section. The ADA signal is passed by OR gate G15 to AND gate G1. The BAD signal is to the other input of AND gate G1. Gate G2 passes the signal to one input of gate G10. When the ringing command is recognized by the command section of the line circuit, a signal is sent on ring lead RNG. This ring signal is sent to an input of gate G10 and when the signal coincides with the signal on gate G2 output, the flip-flop comprised of gates G11 and G12 is switched to place a "1" signal on the input to ampifier G16.

Relay RU is energized by this signal. Relay RU on energization operates its contacts RU1, RU3 and RU4. At contacts RU1 and RU4, a path is closed from the ring bus or ring highway to the tip and ring leads to the stations. Ringing is therefore applied to the lines. (See FIG. 1).

Ringing will stop under the following conditions:

(1) When the calling party abandons the call. Under this condition, the system control instructs the line to terminate ringing by a signal on lead RST. This signal is applied to an input of gate G13 which puts out a zero, causing the flip-flop comprised of G11/G12 to reset at G11 (0) and G12 (1). Consequently, gate G16 switches to a "1" which, in turn, causes relay RU to de-energize. On de-energization, contacts RU1, RU3 an RU4 restore and open the path between the ring source and the conductors to the station being rung.

(2) If the called party answers, a more positive voltage appears on the ring lead because of the divider action of resistor MR1 and the lower resistance of the off-hook telephone. Diode A1D6 is forward biased and amplifier A1 goes to GND. As a result, flip-flop G11/G12 is reset via gate G4. Reset of the flip-flop G11/G12 causes relay RU to restore.

For straight line ringing, a ringing current waveform such as that shown on FIG. 6 is provided with the waveform available at the ring source bus. During call processing, the computer determines a line to be rung during a particular time period. By suitable timing controls, the end of an interrupt and the start of a ring burst interval is synchronized with the ring current waveform. With a timing of one second on, one second off in the ring bursts direct synchronization may be afforded. With other on-off burst ratios, other synchronizing techniques would be used.

By using the principle shown in FIG. 1, a number of variations are possible. For example, FIG. 6 shows the method by which frequency selective party line ringing may be provided. In FIG. 6, three different frequencies are provided, each during a different time interval of the computer interrupt cycle. A computer of any known type usable herein causes its interrupts I0 etc. to occur after each time period T. Thus, party line selective frequency ringing may be applied by time multiplexing the signals of different frequencies, F1 during time T1, F2 during time T2, etc.

In the example drawn by FIG. 6, with an interrupt interval duration of 0.1 seconds and a timing interval of 1.9 seconds, frequency F1 could be applied during period T1, frequency F2 during period T2, etc. by operating the proper RU relay in the line circuit during the proper timing interval.

Also shown in FIG. 6 is a method of using the basic principle shown herein for hotel-motel features within a PBX system. For such systems, using time division principles, straight line ringing may be applied to all stations (whose line circuit RU relay is operated) during period T1. Message waiting signals may be sent to all stations whose line circuit RU relay is operated during interval T2. In similar fashion, Do Not Disturb signals may be sent during interval T3 and other signals during period T4.

In a system as shown in FIG. 2, the line circuits are grouped in shelves and the shelves are grouped in racks. In one exemplary system, each rack may contain seven line shelves. Of these line shelves, one may contain 80 line circuits and the other six may contain as many as 120 line circuits. There may be as many as 16 line racks in a system including 112 line shelves. A possible implementation of the present concept with minimum conflicts then might be to treat each line shelf as an individual signalling highway which is switched appropriately to the different signal generators or detectors or measurement units through a metallic switch of conventional and simple characteristics.

For the examples shown in FIGS. 2 and 6, each one of the 112 line shelves in the system is treated as an individual signal highway although of course, many of these can be combined together. In this arrangement, however PBX lines and standard lines may be in shelves 0 and 7, coin lines and standard lines in shelves 1 and 8 and two-party lines and standard lines in shelves 2 and 9. The rest of the shelves would contain standard straight line ringing or 4-party frequency selective ringing as required.

Viewing FIG. 2, it can be seen that line shelf 0 connected to horizontal conductor Ho normally will receive ringing current through the ringing generator and ground service circuit. Immediate ringing is applied simply by operating the appropriate relay of the appropriate line circuit under computer control. When it is desired to perform line testing on a particular line, say line 79, the crosspoint at the intersection of horizontal conductor Ho and vertical conductor Vo is operated thus disengaging ringing from shelf 0. The crosspoints associated with conductors Ho and V4 are operated for the length of a microcycle, while relay RU of line 79 is also operated for a microcycle.

Similar arrangements would be made for other shelves and other resource circuits. It is worthwhile to note that there are no crosspoints in the intersection between conductors HO and V1 and H6 and V1. Crosspoints can be omitted since these shelves have been allocated to single or two-party subscribers, and do not require the resource or signal circuits coupled to the vertical conductors. On the other hand, there are no crosspoints between conductors H111 and VO, but there is a crosspoint between conductors Hill and V1, the reason being that line shelf 111 would require four-party frequency, selective ringing.

The signalling highway concept offers complete flexibility, and the inherent conflict problem due to congestion can be reasonably resolved by the appropriate assignment of special circuits in groups. A very attractive economic feature of these principles arises in full electronic systems such as digital or space division electronic switching systems. Services in such systems which require high voltage or metallic connections to lines can now be offered on a per traffic basis instead of a per line basis without the addition of any further equipment to the line circuit other than the already required ringing relay. The invention as proposed restricts the automatic testing by the system of the line circuit to that achievable through the RG lead. That is the detection of the capability of the line circuit to ring-trip and to correctly recognize dial pulses.

Figure 5:
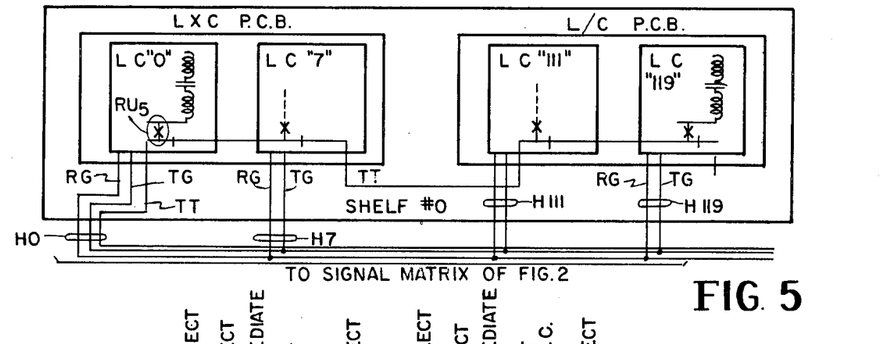
FIG. 5 is a schematic block diagram of line circuit grouping for the further improvement of the invention.

In FIGS. 4 and 5, there is shown, means for providing for bidirectional signalling through a line circuit. The portion of line circuit shown in FIG. 4 can be identified as that on the upper left portion of FIG. 3. By adding and bringing out a lead called RT as shown in FIG. 4 for the ring side and by an additional set of contacts TT from the tip side of the line circuit, we can now generalize completely the signalling highway technique and its line circuit testing capabilities to any and all line circuits for electronic switching equipment where appropriate number of contacts are available in the ringing relay. Thus, a system, to provide complete line testing capabilities from both the tip and ring side would require five ringing relay transfer contacts. Whether this number is provided or not is an economic consideration against the additional test value received. In other line circuits a lesser number of contacts may be required for the line circuit function and as long as two transfer contacts are available for the line test circuit function, the common signalling highway can achieve complete line testing from an automatic centralized point.

With reference to FIG. 4, the signal TT is brought to the common highway by connecting to the ring side of the line circuit through contact RU2. FIG. 2 shows how transmission testing can now be accomplished within the context of the common signalling concept for each individual line circuit. This will also include the ability to pass touch tone and the ability to decode pushbutton dial multi-frequency tone signals by the system by going through the wire chief through the common signalling highway. In accordance with this arrangement, the tip lead T of each line circuit if brought in through a set of contacts of the ringing relay RU in the form of a preference chain as an additional wire of the common signal highway, thus providing three wires in the common signal highway and allowing access to line circuit tests from the wire chief. Thus we are now able to transmit tones by applying them through the ring lead of the appropriate line circuit and detecting the transmission at a different port. In addition, dial pulses can be transmitted by appropriate interruptions from the wire chief tester through the TT lead and through the ring lead.

Thus, we have shown a system for providing bidirectional signals to and from lines for use in systems which do not have full metallic paths for each party to a call through the network.

We claim:

1. A telephone system having a plurality of lines, each coupled to one or more stations, a central processor for processing calls to and from said stations over said lines, and a line circuit individual to each line, a metallic signaling highway including a pair of conductors for signaling to said stations and at least one other conductor for receiving signals from said stations, a plurality of sources of testing, indicating and control signals, each said source having a multiple conductor path for access to said highway, certain of said sources including means for receiving signals from said stations, switching means for completing a selected multiple conductor path from one source to said highway through one of said pairs of conductors and one of said other conductors, means responsive to completion of said path to said one source for preventing completion of an access path between said highway and other sources, and further switching means responsive to information from the processor directed to a selected one of said line circuits for completing a metallic path through said selected path from said signaling highway to a station coupled to said selected line circuit to enable bidirectional transmission of signals to and from said selected source over said highway.

2. A system as claimed in claim 1, wherein at least one of said sources includes means for transmitting testing signals to each of said lines over said pair of conductors and said line circuit switching means includes means in a line circuit switched by operation of said line circuit switching means for responding to signals received from its line for receiving resultant signals in response to transmittal of testing signals over said other conductor of said highway.

3. A telephone system having lines directed to stations, a central processor for processing calls to and from said stations over said lines, and a line circuit individual to each line, said line circuits being grouped to provide stations of similar types within a group, a plurality of metallic signaling highways with each highway commonly coupled to one of said line circuit groups, each of said highways including a pair of conductors for signaling to said stations and at least one conductor for receiving signals from said stations, a plurality of sources including a source of special signals, means responsive to information from the processor directed to a selected one of said line circuits for closing a multiple conductor path from a ringing source to a highway, and means responsive to other information received from said processor for interrupting said path to said ringing current source and means for completing a metallic path through the conductors of the signalling highway from said source of special signals to said seleced line circuit to enable bidirectional transmission of signals to and from said selected source over said highway during said interruption.

4. A system as claimed in claim 3, wherein said processor controls each of said highways in time division control during predetermined time intervals, and said coupling of other sources is prevented during a time interval of path closure.

5. A system as claimed in claim 4, in which the other conductor of said pair of conductors is coupled to a preference chain with switching means in each of said line circuits, and in which there is a hybrid in each line circuit bypassed by signals from said source and receptive of signals from stations of its line.

* * * * *